(12) United States Patent
Funatsu

(10) Patent No.: US 9,344,617 B2
(45) Date of Patent: May 17, 2016

(54) IMAGE CAPTURE APPARATUS AND METHOD OF CONTROLLING THAT PERFORMS FOCUS DETECTION

(71) Applicant: CANON KABUSHIKI KAISHA, Tokyo (JP)

(72) Inventor: Yoshihiro Funatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/260,182

(22) Filed: Apr. 23, 2014

(65) Prior Publication Data

US 2014/0320734 A1 Oct. 30, 2014

(30) Foreign Application Priority Data

Apr. 26, 2013 (JP) .................. 2013-094638

(51) Int. Cl.
*H04N 5/232* (2006.01)
*H04N 5/345* (2011.01)

(52) U.S. Cl.
CPC .......... *H04N 5/23212* (2013.01); *H04N 5/3456* (2013.01)

(58) Field of Classification Search
CPC .......... H04N 5/23212; H04N 5/23216; H04N 5/23245; H04N 5/3456; G03B 13/36; G02B 7/36
See application file for complete search history.

(56) References Cited

U.S. PATENT DOCUMENTS

| 7,839,439 | B2 * | 11/2010 | Sato et al. ................ 348/241 |
| 8,218,036 | B2 * | 7/2012 | Kobayashi ................ 348/241 |
| 2009/0009617 | A1 * | 1/2009 | Ito et al. .................. 348/222.1 |
| 2012/0038810 | A1 * | 2/2012 | Taniguchi ................ 348/308 |
| 2013/0293736 | A1 * | 11/2013 | Kuwazoe ................. 348/222.1 |

FOREIGN PATENT DOCUMENTS

JP 2010-152161 A 7/2010

* cited by examiner

*Primary Examiner* — Luong T Nguyen
(74) *Attorney, Agent, or Firm* — Cowan, Liebowitz & Latman, P.C.

(57) ABSTRACT

An image sensor has multiple pixel units in correspondence with each microlens, and focus detection is performed with a phase-difference detection method using output from the image sensor. The signals to be used in the focus detection can be combined, and a larger signal combining amount is set in the case of output from the image sensor with a first thinning amount than in the case of output from the image sensor with a second thinning amount.

13 Claims, 9 Drawing Sheets

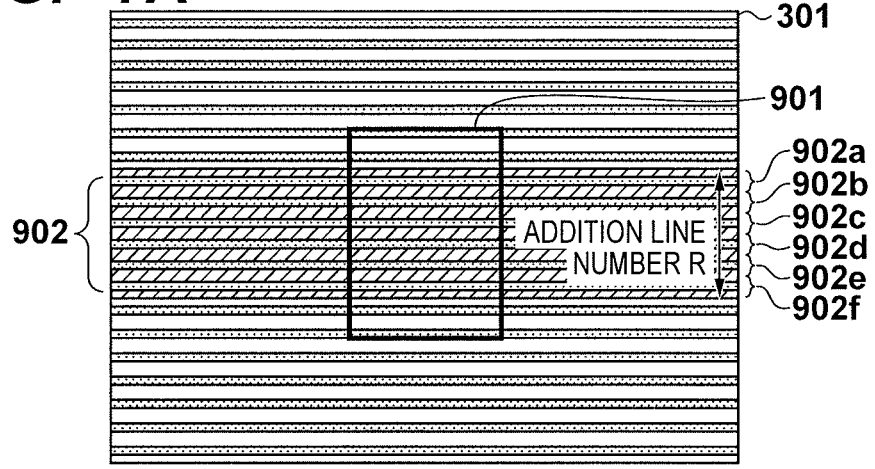
FIG. 7A 3-PIXEL THINNING
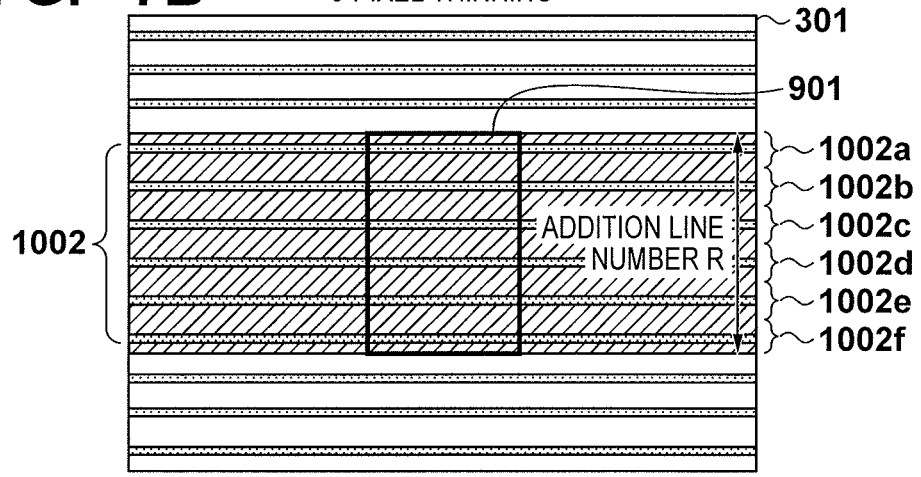
FIG. 7B 5-PIXEL THINNING
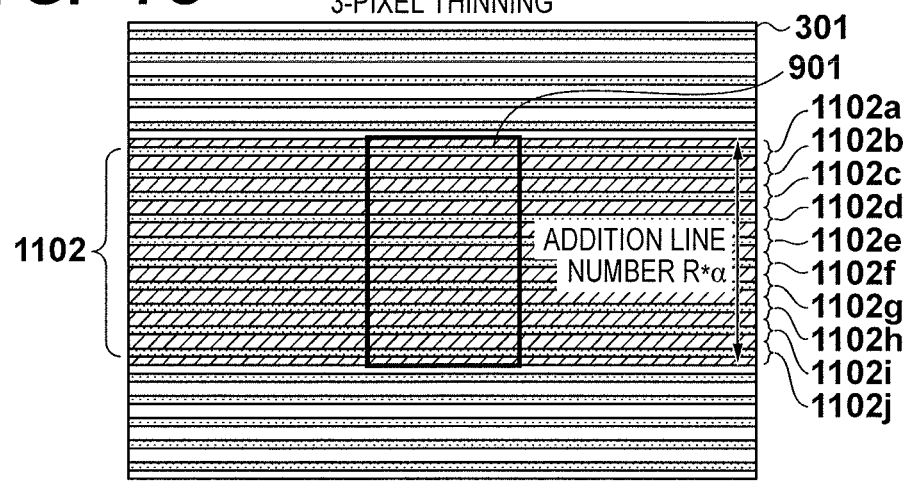
FIG. 7C 3-PIXEL THINNING

3-PIXEL THINNING

5-PIXEL THINNING

IMAGE CAPTURE APPARATUS AND METHOD OF CONTROLLING THAT PERFORMS FOCUS DETECTION

BACKGROUND OF THE INVENTION

1. Field of the Invention

The present invention relates to an image capture apparatus and a method of controlling the same, and in particular relates to a focus detection technique.

2. Description of the Related Art

In image capture apparatuses that use an image sensor, typified by a digital camera, automatic focus detection (AF) is realized by methods mainly divided into a method of using a device for focus defection that is separate from the image sensor, and a method of using the image sensor. The method of using a device for focus detection is a method of obtaining a defocus amount using a correlation amount (phase difference) between two types of image waveforms generated from light flux that exited different exit pupils of an imaging optics system, which is called a phase-difference detection method. Also, the method of using the image sensor is a method of, using the fact that the contrast component of a captured image is the highest at the in-focus position, searching for the focusing lens position at which the contrast component is the highest, which is called a contrast detection method.

The phase-difference detection method has an advantage in that since the defocus amount is immediately obtained from the correlation amount between the image waveforms, only a short amount of time is needed to move the focusing lens to the in-focus position, but on the other hand, there are the problems of an increase in the size of the image capture apparatus and an increase in cost due to the need to provide the device for focus detection. Also, since subject images need to be captured by the device for focus detection during focus detection, focus detection cannot be performed in parallel with imaging performed by the image sensor, or it is necessary to provide a special mechanism such as a half mirror.

For this reason, Japanese Patent Laid-Open No. 2010-152161 proposes a configuration for realizing automatic focus detection using the phase-difference detection method in which light flux that has passed through different exit pupils of the imaging optics system is received by pixels of the image sensor (phase-difference detection on an imaging surface method, which will be referred to hereinafter as "phase-detection AF on an imaging surface"). Phase-detection AF on an imaging surface is characterized by not requiring a device for focus detection and also making it possible for automatic focus detection using the phase-difference detection method (phase difference AF) to be carried out in parallel with imaging performed by the image sensor.

It is desirable for the image signals necessary for phase difference detection in phase-detection AF on an imaging surface to be generated from signals obtained from a two-dimensional (multiple pixel rows×multiple pixel columns) pixel region (focus detection region). This is because it is difficult to precisely perform phase difference detection using image signals generated from signals obtained from a one-dimensional focus detection region (one pixel row or column).

Japanese Patent Laid-Open No. 2010-152161 discloses that image signals are generated from pixels, a pair of focus detection image signals are generated by aligning the signals in each pixel row in the direction in which the pixel columns extend, and the phase difference (image misalignment amount) is calculated from the one-dimensional focus detection image signals. It also discloses a method of obtaining a two-dimensional focus detection image misalignment amount by adding up the image misalignment amounts of multiple pixel lines from a two-dimensional focus detection region.

In general, when performing imaging using phase-detection AF on an imaging surface, focus detection is performed while capturing moving images using the image sensor, and the captured video is displayed as a live preview on the display unit of the image capture apparatus. The pixel count of image sensors currently in common use is greater than the pixel count of the display unit, and therefore the video to be displayed as a live preview is generated by thinning out the pixels in the captured video frames. Also, thinning out the pixels while performing readout from the image sensor reduces the processing load compared to thinning out the pixels after reading all of them out. Furthermore, the thinning number (thinning rate) is not constant, but rather is generally increased as the load increases (e.g., as the frame rate increases). After thinning-readout, resize processing is performed as necessary in order to obtain a display image.

However, in the image signal generation method described in Japanese Patent Laid-Open No. 2010-152161, when a pixel signal is thinned out, the pixel range of the image sensor in which focus detection image signal readout is performed changes according to the thinning number. Since the thinning number changes according to the readout frame rate, for example, in the case of using different frame rates for different shooting modes, the focus detection image signal 0

Letting m be the thinning number, a pixel range having n lines in the thinned image is constituted by pixels read out from a pixel range of m×n lines in the pre-thinning image (original image). Accordingly, the lower the thinning number m is, the smaller the corresponding pixel area in the original image is. Therefore, the area of the original image used to acquire the image signal (readout area) is smaller when the thinning number is low than when the thinning number is high, and the entirety of the focus detection region cannot be covered, and thus the precision of the focus detection decreases.

SUMMARY OF THE INVENTION

The present invention solved these problems in conventional technology, and provides an image capture apparatus and method of controlling the same that can perform focus detection with stable precision even when the pixel thinning number changes.

The present invention in its first aspect provides an image capture apparatus comprising: a sensor that has a plurality of pixel units in correspondence with a microlens; and a focus detection unit configured to perform focus detection with a phase-difference detection method using output from the sensor, wherein signals to be used in the focus detection can be combined, the focus detection unit sets a larger signal combining amount in a case of output from the sensor with a first thinning amount than in a case of output from the sensor with a second thinning amount, and a thinning amount is higher in a case of using the second thinning amount than in a case of using the first thinning amount.

The present invention in its second aspect provides a method of controlling an image capture apparatus that has a sensor having a plurality of pixel units for a microlens, comprising: a focus detection step of performing focus detection with a phase-difference detection method using output from the sensor, wherein signals to be used in the focus detection can be combined, in the focus detection step, a larger signal combining amount is set in a case of output from the sensor with a first thinning amount than in a case of output from the sensor with a second thinning amount, and a thinning amount is higher in a case of using the second first thinning amount than in a case of using the first thinning amount.

Further features of the present invention will become apparent from the following description of exemplary embodiments with reference to the attached drawings.

BRIEF DESCRIPTION OF THE DRAWINGS

FIGS. 7A to 7C are diagrams showing the percentage of the focus detection region occupied by a readout area corresponding to an addition line number in a first embodiment (when performing three-pixel thinning).

DESCRIPTION OF THE EMBODIMENTS

Exemplary embodiments of the present invention will now be described in detail in accordance with the accompanying drawings.

First Embodiment

Figure 1:
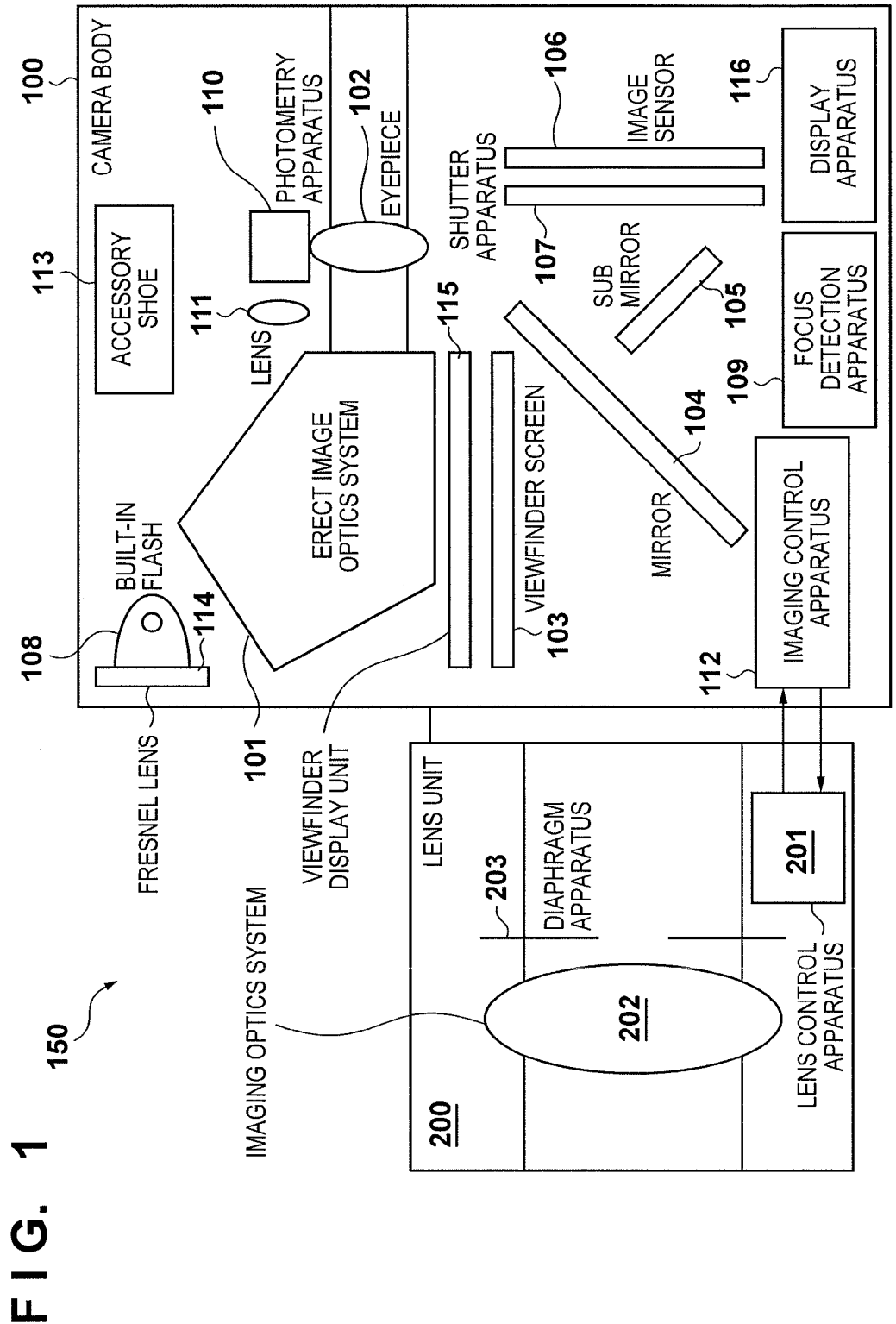
FIG. 1 is a configuration diagram of an image capture apparatus according to the present invention.

FIG. 1 is a diagram showing an example of the configuration of a digital single-lens reflex camera (referred to hereinafter as simply a "camera") 150 serving as an example of an image capture apparatus according to an embodiment of the present invention. The camera 150 is constituted by a camera body 100 and a lens unit 200 that is detachable from the camera body 100. Note that as long as the camera of the present embodiment is capable of performing phase-detection AF on an imaging surface, it does not need to be a single-lens reflex camera, and the lens unit 200 does not need to be exchangeable. Also, the camera may be a function provided in an apparatus. In other words, the image capture apparatus may be any electronic device or apparatus that has a camera function. Examples of such electronic devices or apparatuses include, but are not limited to, mobile phones, personal computers, tablet terminals, media players, gaming devices, navigation apparatuses, and home appliances.

The configuration of the camera body 100 will be described first. An erect image optics system 101 is constituted by a prism, a mirror, or the like, and is configured such that a reflected optical image from a mirror 104 is an erect image when viewed through an eyepiece 102. A subject image is formed on a viewfinder screen 103 by reflected light flux from the mirror 104. The viewfinder screen 103, the erect image optics system 101, and the eyepiece 102 form a viewfinder optics system. Also, a viewfinder display unit 115 is a transmissive display panel, and is for performing display such that various types of information including imaging conditions such as the shutter speed and F-number is superimposed on the subject image formed on the viewfinder screen 103.

The mirror 104 deflects a portion of incident light flux from the lens unit 200 toward the viewfinder screen 103. A sub mirror 105 deflects light flux that passed through the mirror 104 toward a focus detection apparatus 109. When performing imaging with an image sensor 106, the mirror 104 and the sub mirror 105 are moved upward (mirror lock-up) such that light flux from the lens unit 200 forms a subject image on the image sensor 106.

The image sensor 106 is a photoelectric conversion element such as a CCD image sensor or a CMOS image sensor, and includes an array of pixels. The image sensor 106 outputs a subject image formed by the lens unit 200 as electric signals in units of pixels. As will be described later, the image sensor 106 of the present embodiment can generate image signals for phase-detection AF on an imaging surface. As will be described later, the image sensor 106 of the present embodiment has a configuration for generating image signals for phase-detection AF on an imaging surface using pixels provided with multiple photoelectric conversion units and a microlens for pupil division, but it may have another configuration as long as it is possible to generate image signals for phase-detection AF on an imaging surface.

A shutter apparatus 107 is a mechanical shutter that opens to expose the image sensor 106 to light under control of an imaging control apparatus 112. The camera body 100 of the present embodiment has a built-in flash 108, and the built-in flash 108 is provided with a Fresnel lens 114 for diffusing the exiting light. The built-in flash 108 is used not only as an auxiliary light source for imaging, but also as an auxiliary light source for focus detection.

The focus detection apparatus 109 uses a phase-difference detection method to calculate a defocus amount from image signals generated using the device for focus detection. Note that although the focus detection apparatus 109 for performing focus detection when using the optical viewfinder shown in FIG. 1 is provided in the present embodiment, the sub mirror 105 and the focus detection apparatus 109 are not necessary if the image capture apparatus does not have the mirror 104.

A photometry apparatus 110 measures the luminance distribution and the like of a subject image formed by a lens 111. The imaging control apparatus 112 realizes an automatic exposure (AE) control function based on the measurement results obtained by the photometry apparatus 110. The imaging control apparatus 112 controls operations of the camera body 100 and the lens unit 200. The imaging control apparatus 112 is a microprocessor, for example, and controls the operations of various units by executing a program stored in a non-volatile memory. An accessory shoe 113 is used for mounting an external flash or the like. A display apparatus 116 is an LCD, for example, and displays live preview images and various types of information.

The lens unit 200 is exchangeable, and a lens control apparatus 201 performs communication with the imaging control apparatus 112 and controls operations in the lens unit 200. An imaging optics system 202 is constituted by multiple lenses, including a focusing lens. The lens control apparatus 201 controls the driving of the focusing lens of the imaging optics system 202 and the driving of a diaphragm apparatus 203.

Figure 2:
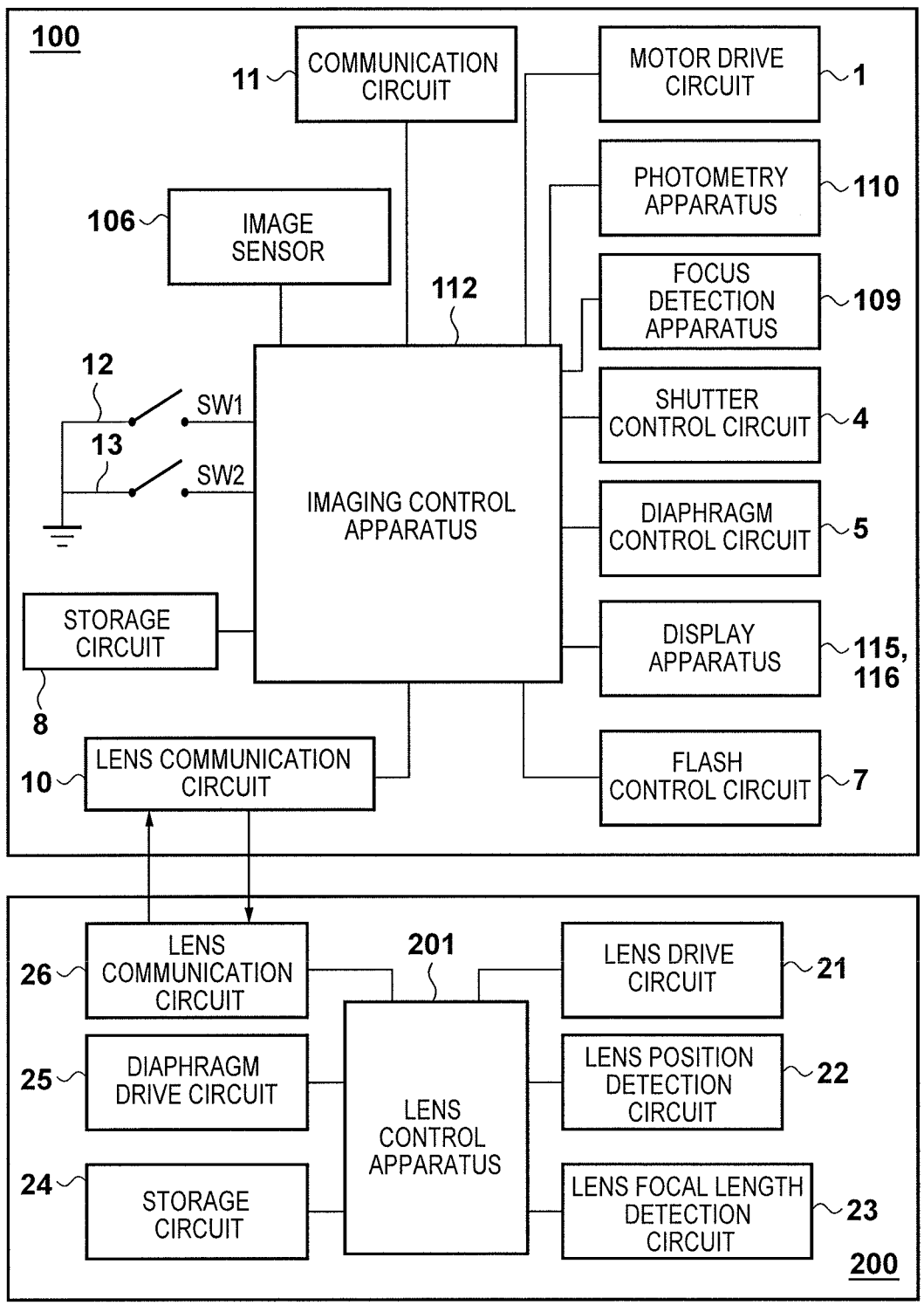
FIG. 2 is a circuit configuration diagram of the image capture apparatus according to the present invention.

FIG. 2 is a block diagram showing an example of the circuit configuration of the camera 150, and configurations that are same as in FIG. 1 have been given the same reference signs, and descriptions will not be given for them. A motor drive circuit 1 drives movable portions of the camera body 100. A shutter control circuit 4 controls the open and close operations of the shutter apparatus 107 under control of the imaging control apparatus 112. A diaphragm control circuit 5 controls the diaphragm apparatus 203 under control of the imaging control apparatus 112. A flash control circuit 7 controls the built-in flash 108 under control of the imaging control apparatus 112. A storage circuit 8 has a non-volatile storage circuit for storing the setting state of the camera body 100, programs, and the like, and also has a volatile storage circuit for executing programs and temporarily storing data. Also, the imaging control apparatus 112 and the lens control apparatus 201 of the lens unit 200 perform communication via lens communication circuits 10 and 26.

A communication circuit 11 is included in the accessory shoe 113, and is used for communication with an external flash. A SW1 12 is a switch for starting an imaging preparation operation, and a SW2 13 is a switch for starting imaging. In general, the SW1 and SW2 are configured such that the SW1 turns on when a release button is pressed halfway, and the SW2 turns on when the release button is pressed all the way.

A lens drive circuit 21 in the lens unit 200 drives the focusing lens included in the imaging optics system 202. Also, if the imaging optics system 202 is a zooming lens, the lens drive circuit 21 additionally performs driving for changing the angle of view of the imaging optics system 202. A lens position detection circuit 22 detects the position of the focusing lens. A lens focal length detection circuit 23 detects the current angle of view (focal length) if the imaging optics system 202 is a zooming lens. A storage circuit 24 is a non-volatile storage circuit for holding setting values of the lens unit 200. A diaphragm drive circuit 25 drives the diaphragm apparatus 203. The lens communication circuit 26 is used for communication between the lens control apparatus 201 and the imaging control apparatus 112.

The image sensor 106 will be described next.

Figure 3A:
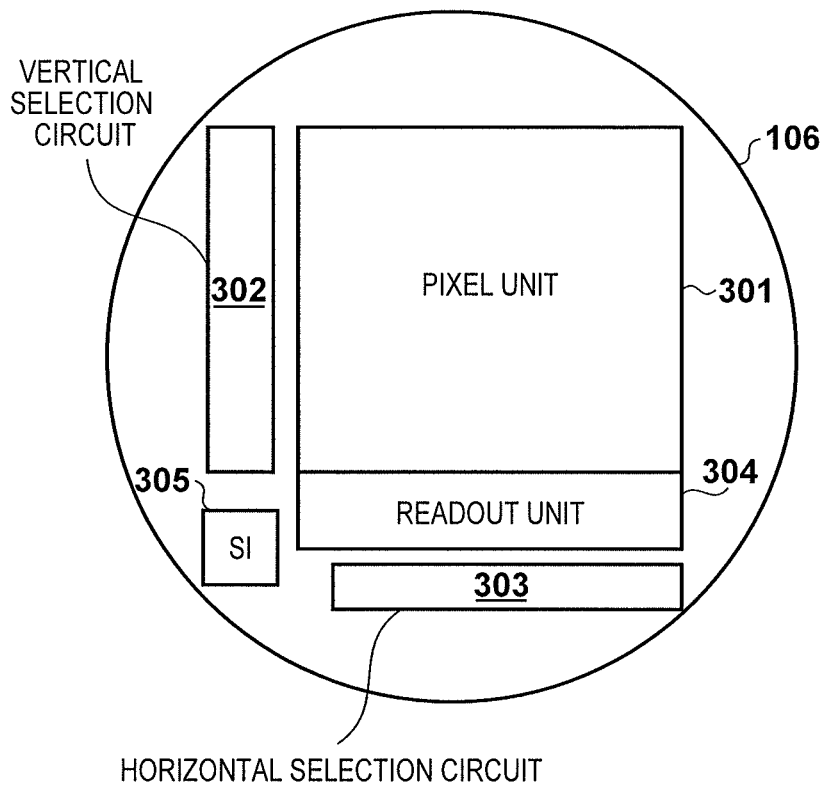
FIGS. 3A and 3B are schematic diagrams of an image sensor.

FIG. 3A is a configuration diagram showing an overview of the image sensor 106. A pixel unit 301 has multiple pixels arranged in multiple rows and multiple columns. A vertical selection circuit 302 and a horizontal selection circuit 303 respectively select pixel rows and pixel columns in the pixel unit 301. A readout unit 304 is constituted by a memory for storing signals, a gain amplifier, an AD converter, and the like, which are provided for each pixel column. A serial interface 305 is used by the imaging control apparatus 112 to designate the operation modes and the like that are to be used by circuits in the image sensor 106.

Figure 3B:
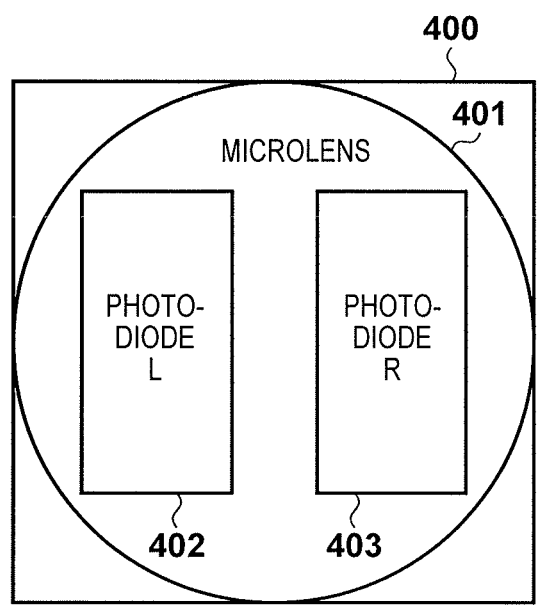

FIG. 3B is a plan view of an example of the configuration of a pixel included in the pixel unit 301 of the image sensor 106, as viewed from the direction in which a light beam is incident. A microlens 401 disperses light flux that is incident on the pixel 400. The pixel 400 is provided with two photodiodes as examples of the multiple photoelectric conversion units, namely a photodiode L (referred to hereinafter as the "PDL") 402 and a photodiode R (PDR) 403.

Figure 4:
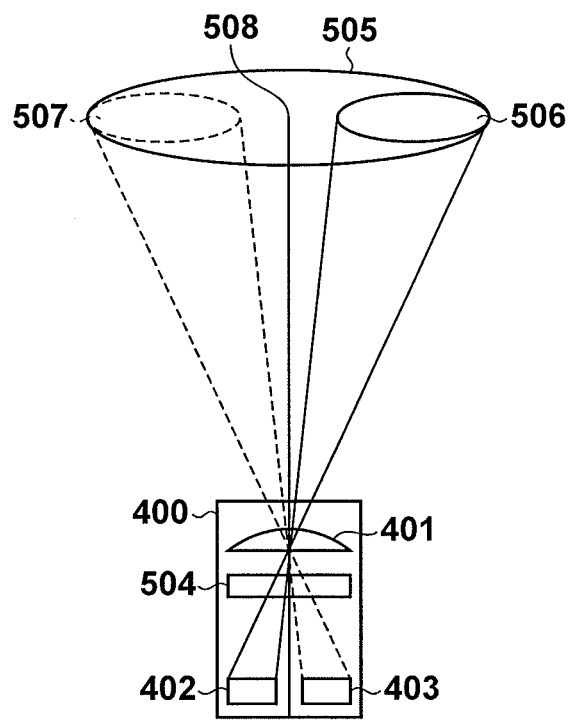
FIG. 4 is a conceptual diagram of the case where light flux exiting from exit pupils of a taking lens is incident on a pixel.

Next, the principle according to which signals for phase-detection AF on an imaging surface are obtained from the pixel 400 will be described with reference to FIG. 4. FIG. 4 is a conceptual diagram showing ranges of light flux that is incident on the pixel 400 from an exit pupil 505 of the lens unit 200. FIG. 4 shows an example of the vertical (depth-direction) structure of the pixel 400. Also, although not shown in FIG. 3B, the pixel 400 has a color filter 504 between the microlens 401 and the PDL 402 and PDR 403.

Light flux that has passed through the exit pupil 505 is incident on the pixel 400 centered about an optical axis 508. The light flux is divided into two portions via the microlens, and is incident on the PDL 402 and the PDR 403. At this time, the light flux incident on the PDL 402 is light flux that exited from an exit pupil 506, and the light flux incident on the PDR 403 is light flux that exited an exit pupil 507. In this way, the PDL 402 and the PDR 403 receive light flux from different exit pupils, and phase-difference focus detection can be performed by reading out the signal obtained by the PDL 402 and the signal obtained by the PDR 403 from the pixel 400.

Figure 5:
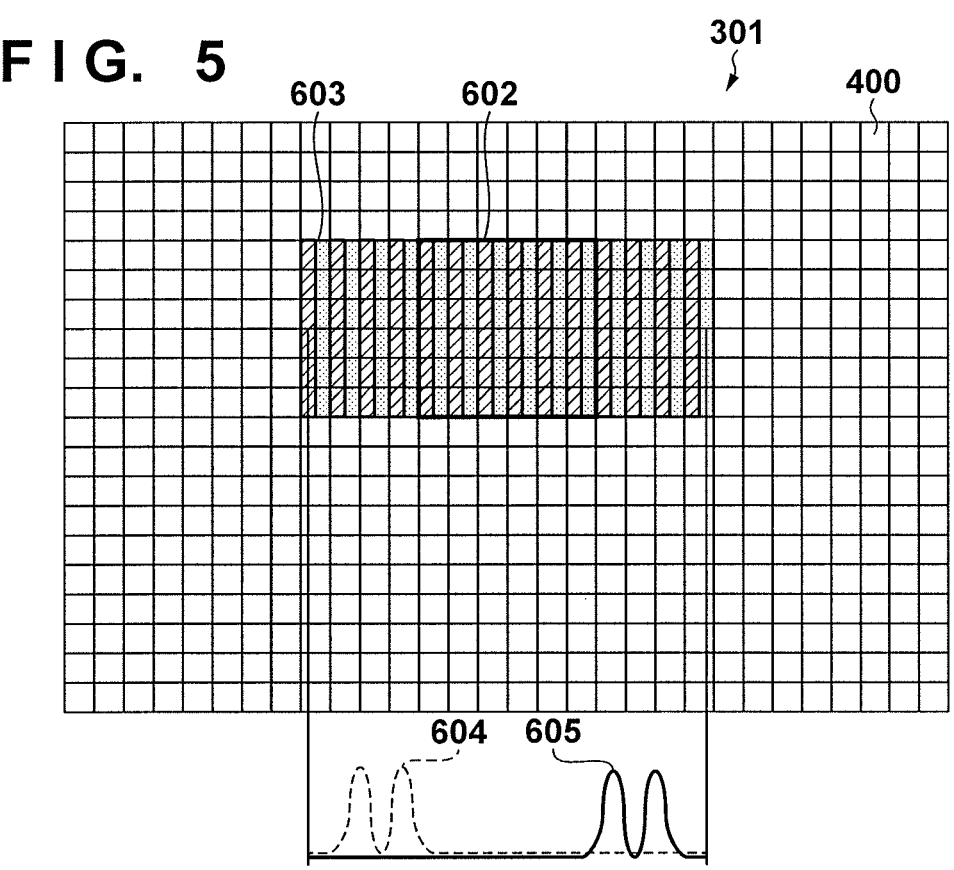
FIG. 5 is a pixel configuration diagram of an image capture apparatus.

FIG. 5 shows an example of the pixel arrangement in the pixel unit 301 of the image sensor 106. Multiple pixels 400 shown in FIG. 3B are arranged two-dimensionally in the pixel unit 301. In the case of performing phase-detection AF on an imaging surface, signals for focus detection are generated using signals read out from pixels that correspond to a pre-set focus detection region 602. In the present embodiment, the readout area that corresponds to the pixel line read out while performing thinning is made up of a number of lines equal to the thinning number. In other words, in the case of the thinning number 3, the readout area that corresponds to one pixel line read out while performing thinning is made up of three pixels lines. Note that the thinning number is not the thinning amount (i.e., the number of lines that are thinned out or excluded), but rather means performing thinning out by (1/thinning number), and can also be considered to be the thinning rate. In other words, if the vertical thinning number is 3, one line is read out for every three lines. Also, it is assumed that the pixels that are read out are the pixels at the center of the corresponding readout area, or the closest to the center. In other words, if the vertical thinning number is 3, among the three lines in the readout area, the line in the center is read out. If the vertical thinning number is 4, among the four lines in the readout area, the second or third line is read out.

Image signals are respectively generated from a signal group obtained from the PDLs 402 and a signal group obtained from the PDRs 403, which are obtained for each line from the signals read out from the pixels in a readout area 603, and the same type of image signals are added up in the column direction in order to generate two types of image signals for phase-detection AF on an imaging surface. In this way, the image signals for focus detection are generated by generating image signals for each line and then adding up a pre-set number of lines (addition line number) worth of the generated image signals. The number of lines in the readout area 603 for the generation of the image signals for focus detection is equal to the product of the addition line number and the thinning number.

In FIG. 5, an image signal 604 has been generated from signals read out from PDLs 402, and an image signal 605 has been generated from signals read out from PDRs 403. The defocus amount of the imaging optics system 202 is calculated from the phase difference between these two types of image signals 604 and 605. Since any known method may be used as the method for obtaining the defocus amount from the phase difference between the two image signals, the method will not be described here.

Next, thinning-readout will be described.

Figure 6A:
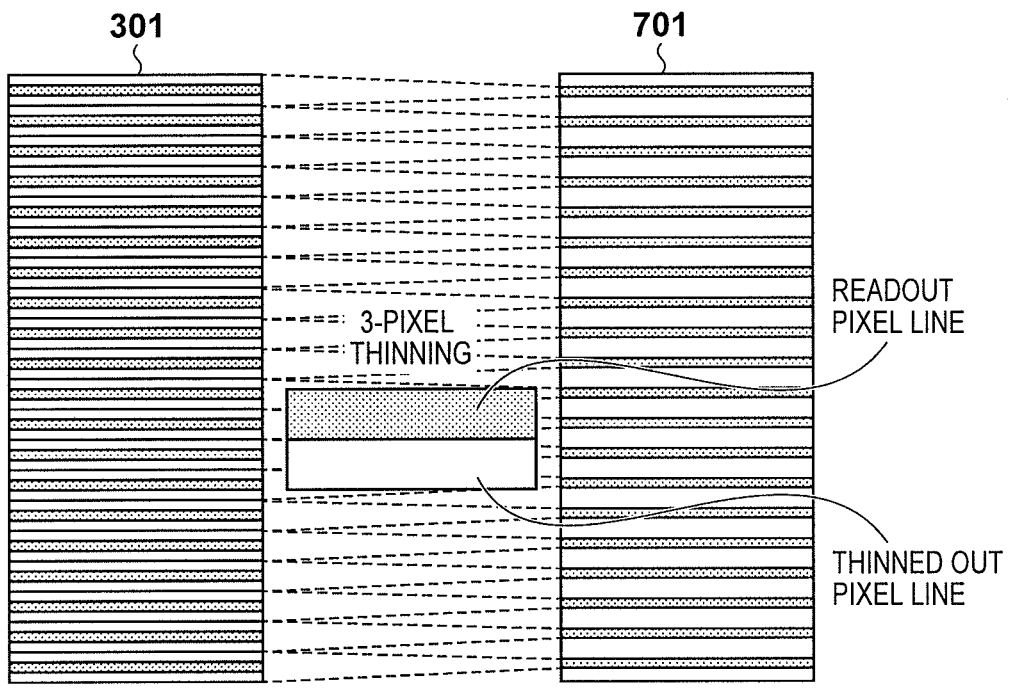
FIGS. 6A and 6B are diagrams showing pixels resulting from pixel thinning.
Figure 6B:
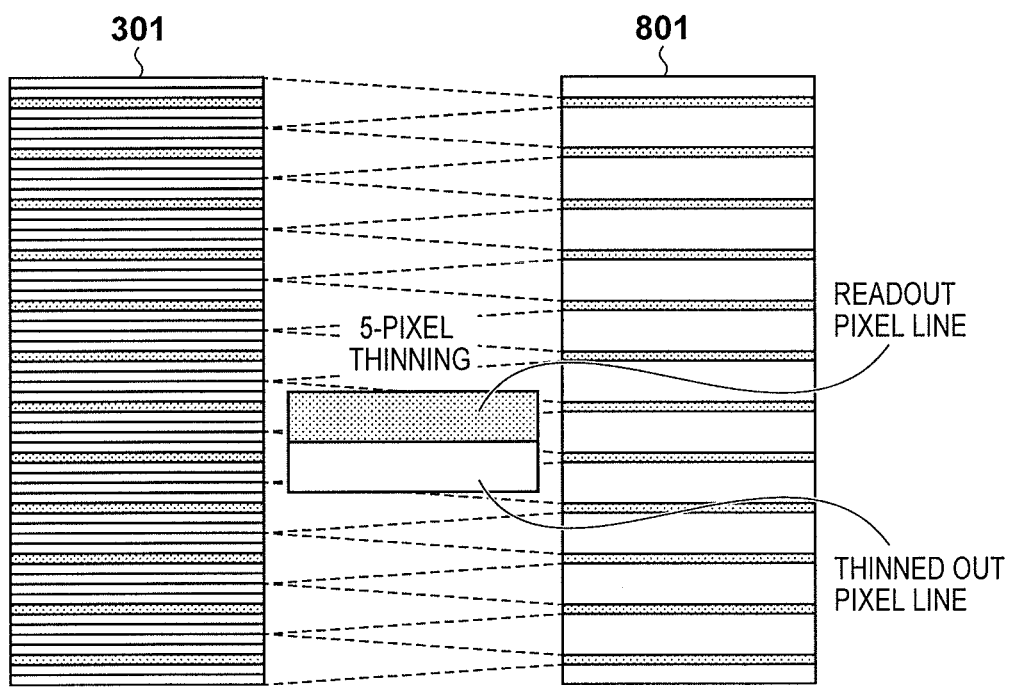

FIG. 6A illustratively shows an example of the pixel lines that are read out and the pixel lines that are thinned out (not read out) in the case of performing readout from the pixel unit 301 while performing three-pixel thinning (thinning number 3) in the vertical direction. Here, 701 indicates the structure of pixels after thinning. Note that pixels are not present in the white portions in 701. As can be understood from FIG. 6A, in the pixel unit 301, pixel signals are read out from only one line for every three lines, that is to say from only the gray pixel lines, and pixel signals are not read out from the white pixel lines. Similarly, FIG. 6B shows the case of performing five-pixel thinning-readout in the vertical direction, and 801 indicates the structure of pixels after thinning. As can be understood from FIG. 6B, in the pixel unit 301, pixel signals are read out from only one line for every five lines, that is to say from only the gray pixel lines, and pixel signals are not read out from the white pixel lines. In this way, the lower the thinning number is, the smaller the gap is between lines from which pixels are read out, and the smaller number the thinning amount is.

Next, the relationship between the thinning number and the percentage of the focus detection region occupied by the readout area corresponding to the addition line number R will be described with reference to FIGS. 7A and 7B. Similarly to FIG. 6A, FIG. 7A shows the relationship between a readout area 902 and a focus detection region 901 in the case of performing readout from the pixel unit 301 with the vertical thinning number 3. The readout area 902 includes pixel lines 902a, 902b, 902c, 902d, 902e, and 902f. The vertical size of the readout area 902 is defined by the product of the thinning number n and the addition line number R. Since the addition line number R is 6, the vertical size of the readout area 902 is 18 lines. As previously mentioned, the addition line number R is a predetermined fixed value, and is not dependent on the thinning number.

Also, similarly to FIG. 6B, FIG. 7B shows the relationship between a readout area 1002 and a focus detection region 901 in the case of performing readout with the vertical thinning number 5. The readout area 1002 includes pixel lines 1002a, 1002b, 1002c, 1002d, 1002e, and 1002f. Since the addition line number R is 6, the vertical size of the readout area 1002 is 30 lines. In both FIG. 7A and FIG. 7B, the gray pixel lines are pixel lines from which signals are read out, and the hatched portions indicate readout areas for generating image signals for focus detection. It can be understood from FIGS. 7A and 7B that compared to five-pixel thinning, when using three-pixel thinning with a smaller gap between readout pixel lines, the percentage of the focus detection region 901 occupied by the readout area in the vertical direction is smaller. As shown in FIG. 7A, pixel lines not used for image signal generation are present above and below the focus detection region 901, and focus detection cannot be performed for subjects that are only included in these pixel lines.

FIG. 7C shows a readout area corrected according to the present embodiment. FIG. 7C shows the relationship between a corrected readout area 1102 and the focus detection region 901 in the case of performing readout from the pixel unit 301 with the vertical thinning number 3. The corrected readout area 1102 includes pixel lines 1102a to 1002j. Here, as shown in FIG. 7B, in order for the readout area in the case of the vertical thinning number 5 to include the entirety of the focus detection region 901, the addition line number R has been corrected such that the readout area is the same as when performing five-pixel thinning. Specifically, the pre-correction addition line number R(=6) is multiplied by a thinning ratio α to obtain an addition line number αR that is used as the corrected addition line number, and that corrected addition line number is used to set the corresponding readout area. The thinning ratio can be calculated using the following equation.

α=reference thinning number/current(pre-correction) thinning number

In the examples shown in FIGS. 7A to 7C, the thinning ratio α is 5/3, and therefore the corrected addition line number R is obtained by multiplying the original addition line number R by 5/3 to obtain 10, and the vertical number of lines in the pixel readout area multiplied by the thinning number 3 is 30 lines, which is the same as in the case of the thinning number 5. In this way, due to the addition line number, which is the number of pixel lines from which signals are to be read out, being corrected by the thinning ratio, the size of the corresponding readout area will be the same as in the case of the reference thinning number regardless of the thinning number. Note that in the first embodiment, the entirety of the focus detection region is included when performing five-pixel thinning in the vertical direction, and therefore the reference thinning number is 5. Subject detection can be performed in the entirety of the focus detection region by calculating the defocus amount using image signals obtained from a readout area set based on the corrected addition line number.

Figure 8:
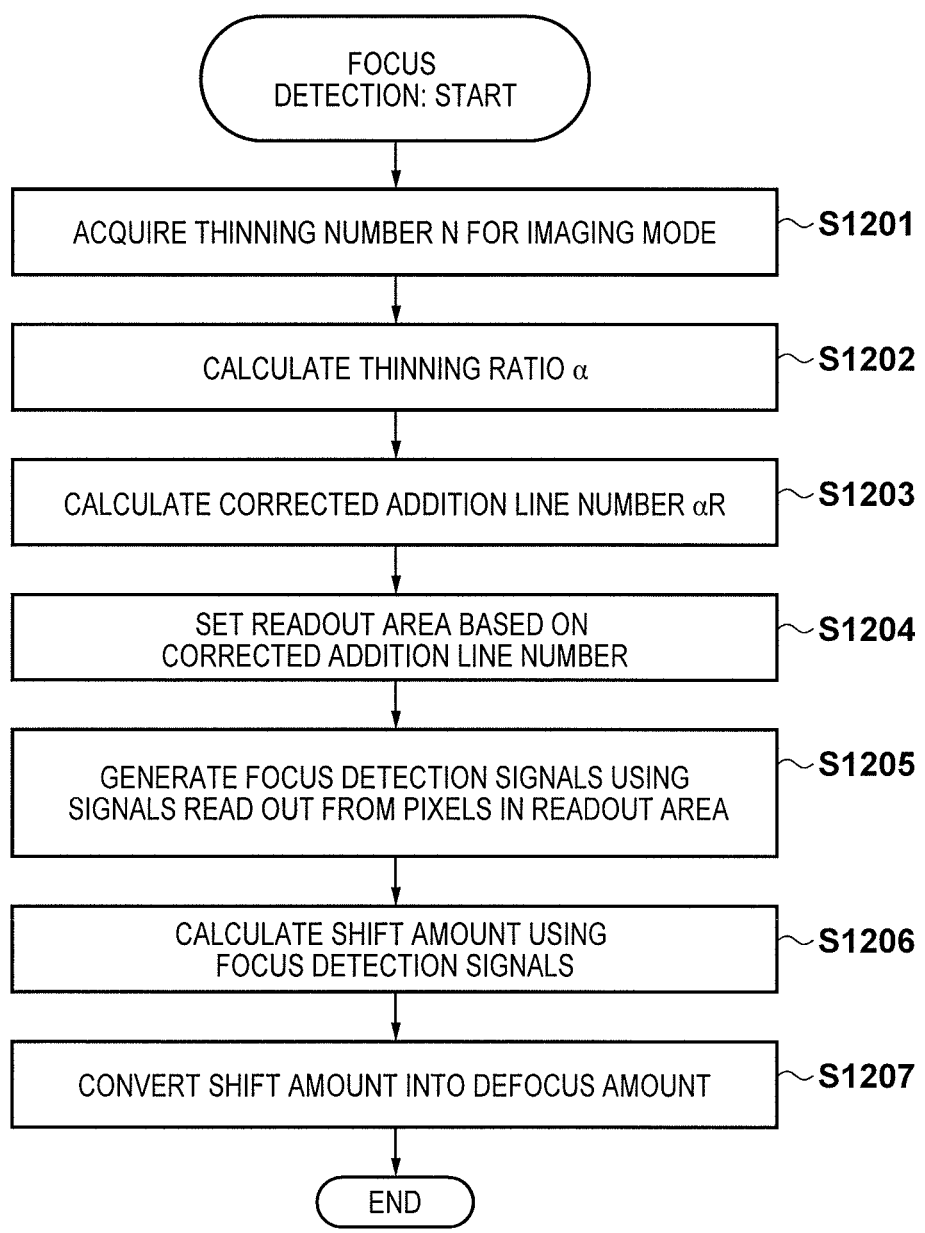
FIG. 8 is a flowchart of focus detection according to the present invention.

FIG. 8 is a flowchart for describing the operation for phase-detection AF on an imaging surface in the present embodiment. This operation is carried out in the imaging preparation operation that is started due to the SW1 turning on, for example.

In step S1201, the imaging control apparatus 112 acquires the thinning number n that is currently set. The thinning number n can be acquired by preparing a table associating shooting modes and thinning numbers n or the like, and referencing the table using the current shooting mode, or it may be acquired using another method. For example, a configuration is possible in which a table associating shooting frame rates and thinning numbers n or the like is prepared, and the thinning number n is acquired by referencing the table using the current shooting frame rate. Also, the thinning number n may be acquired without using a table, by applying the shooting frame rate to a calculation equation that has been prepared in advance.

In step S1202, the imaging control apparatus 112 calculates the thinning ratio α from the thinning number n acquired in step S1201 and the predetermined reference thinning number as described above. In step S1203, the imaging control apparatus 112 calculates the corrected addition line number αR from the addition line number R and the thinning ratio α.

In step S1204, the imaging control apparatus 112 sets the pixel area from which signals are to be read out for image signal generation in accordance with the corrected addition line number αR that was calculated. Although there are no particular limitations on the setting method, it is possible to use a correspondence relationship between the focus detection region and a pixel line that has been stored in advance. For example, a configuration is possible in which, for example, considering the top pixel line to be 1, and using line numbers that increase downward in the vertical direction, the line number of the readout pixel line that is at the center of the focus detection regions or closest to the center is stored in association with the thinning number as position information. The imaging control apparatus 112 can set the readout area by acquiring that line number based on the thinning number n that was acquired in step S1201, and assigning the number of lines that is obtained with the corrected addition line number αRn as evenly as possible in the vertical direction. For example, if the readout line number of pixel line 902d in FIG. 7A is stored as position information, a readout area such as that shown in FIG. 7C is set by setting the readout area to a range in which six lines are added above 902a and six lines are added below 902f.

Note that what is stored as position information may be the number of the first readout pixel line included in the focus detection region, or the number of the last readout pixel line included in the focus detection region. In the case where the number of the first readout pixel line included in the focus detection region is the position information, the number of lines αRn from the line corresponding to (position information−(thinning number n/2)) can be set as the readout area. Note that the pixel readout area in the horizontal direction need only be an area that is a predetermined number of pixels larger in the left and right directions centered about the focus detection region 901 as shown in FIG. 5.

In step S1205, the imaging control apparatus 112 generates image signals for focus detection based on signals read out from the PDLs and the PDRs of the pixels included in the readout area that was set in step S1204. In step S1206, the imaging control apparatus 112 calculates a shift amount (phase difference) from the generated image signals. In step S1207, the imaging control apparatus 112 converts the shift amount into a defocus amount, and ends focus detection.

As described above, according to the present embodiment, in an image capture apparatus that generates image signals for phase-detection AF on an imaging surface based on signals read out from pixels in an addition line number-worth of pixel lines included in a focus detection region, the addition line number is corrected according to the ratio between the thinning number for readout and a reference thinning number. In other words, the readout area for generating the image signals for phase-detection AF on an imaging surface is corrected so as to be similar to that used in the case of using the reference thinning number. The image signals for phase-detection AF on an imaging surface are then generated using a readout area set according to the corrected addition line number, thus making it possible to suppress obtaining a region in which focus detection cannot be performed in the focus detection region, even if the thinning number changes according to the readout frame rate, for example.

Second Embodiment

A second embodiment of the present invention will be described next. The present embodiment mainly relates to readout area correction in the case where multiple focus detection regions are arranged discretely, and focus detection is performed in many focus detection regions at a single time.

Figure 9A:
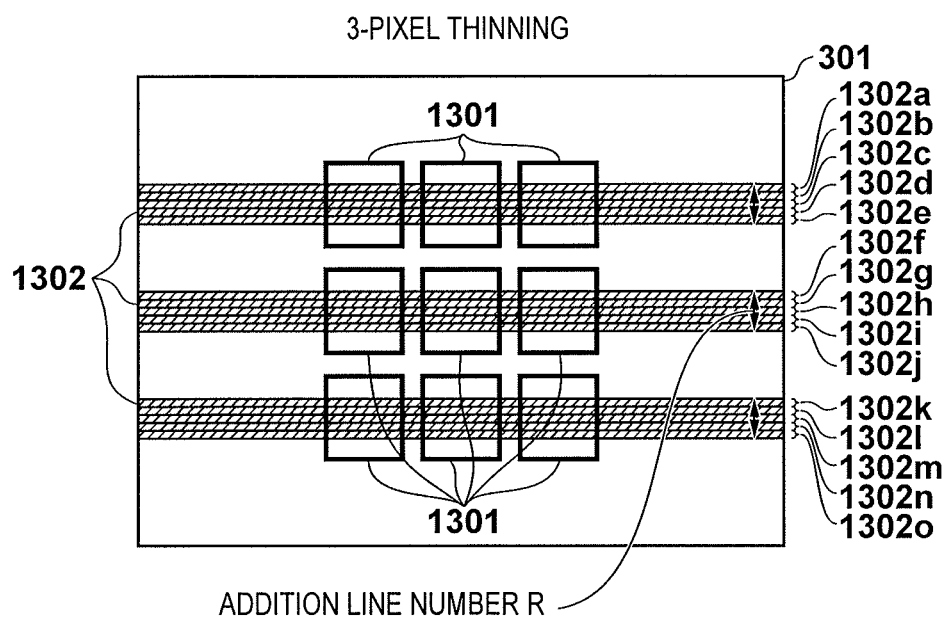
FIGS. 9A to 9C are diagrams showing the percentage of the focus detection region occupied by the readout area in a second embodiment (when performing three-pixel thinning).
Figure 9B:
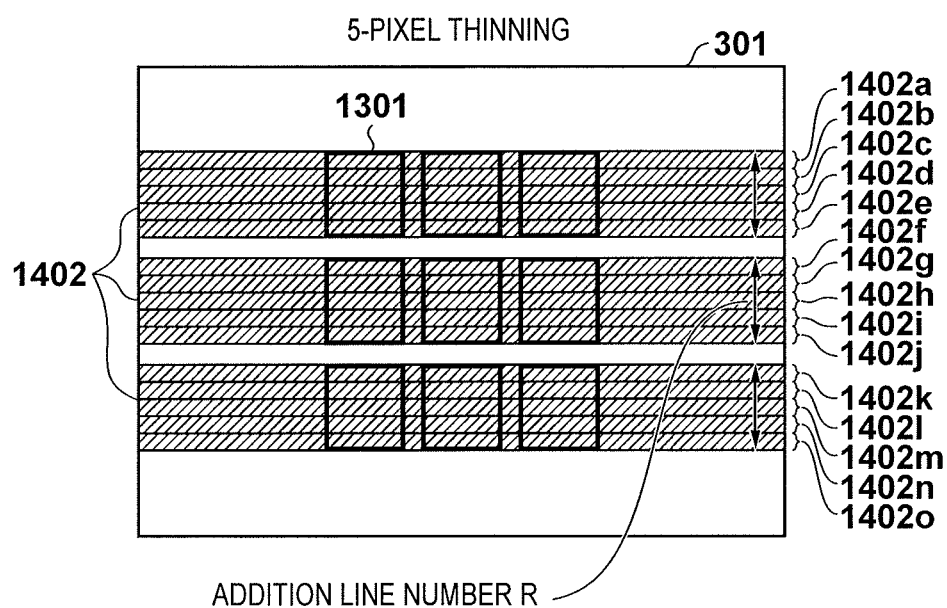

Similarly to FIGS. 6A and 6B, FIGS. 9A to 9C are diagrams showing the relationship between the thinning number and readout areas, in the case where multiple focus detection regions 1301 have been set. Similarly to FIG. 6A, FIG. 9A shows the relationship between readout areas 1302 and focus detection regions 1301 in the pixel unit 301 in the case where the addition line number R is 6 and the vertical thinning number is 3. The readout areas 1302 are respectively made up of pixel lines 1302a to 1302e, 1302f to 1302j, and 1302k to 1302o for each of three focus detection regions set in the horizontal direction. Also, similarly to FIG. 6B, FIG. 9B shows the relationship between readout areas 1402 and focus detection regions 1301 in the pixel unit 301 in the case where the addition line number R is 6 and the vertical thinning number is 5. The readout areas 1402 are respectively made up of pixel lines 1402a to 1402e, 1402f to 1402j, and 1402k to 1402o for each of three focus detection regions set in the horizontal direction.

In FIGS. 9A and 9B, the three readout areas have the same addition line number R in the column direction regardless of the thinning number in the center of the focus detection regions 1301 in the vertical direction. Accordingly, similarly to the first embodiment, when the thinning number is low, the percentage of the focus detection region occupied by the readout area is low, and the focus detection region will include pixel lines that will not be used (will not be read out from) in the generation of image signals for phase difference AF. In other words, the focus detection region will include a region in which focus detection cannot be performed.

Figure 9C:
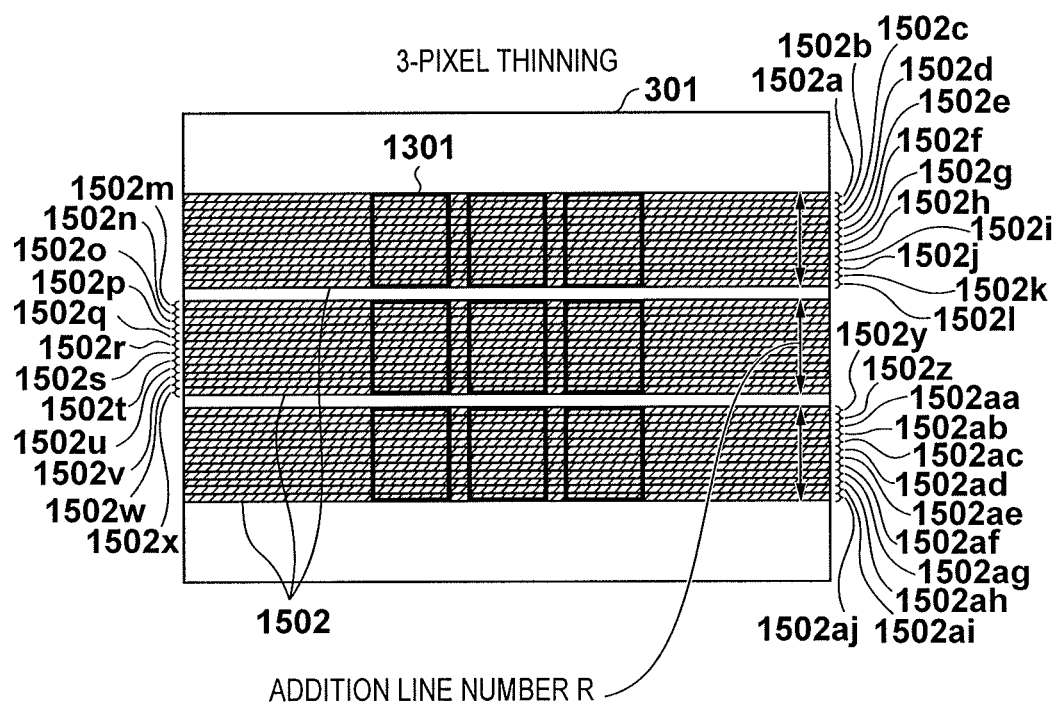

Correction similar to the first embodiment can be performed in the present embodiment as well. FIG. 9C shows the result of correcting the respective readout areas using the addition line number R, similarly to the first embodiment. Corrected readout areas 1502 in the pixel unit 301 are respectively made up of pixel lines 1502a to 15021, 1502m to 1502x, and 1502y to 1502aj for each of three focus detection regions set in the horizontal direction. Using the thinning ratio α, the sizes and positions of the readout areas are set similarly to readout areas in the case of using the vertical thinning number 5 shown in FIG. 9B.

The methods of correcting the addition line number and correcting the readout areas based on the corrected addition line number are the same as those described in the first embodiment.

According to the present embodiment, effects similar to those in the first embodiment are obtained even when multiple focus detection regions are set.

Other Embodiments

Note that only correction in the case where the current thinning number is smaller than the reference thinning number is described in the above embodiments. However, similar correction can be performed even in the case where the current thinning number is larger than the reference thinning number. In this case, the readout area is made smaller. By performing similar correction even in the case where the current thinning number is larger than the reference thinning number, it is possible to suppress the situation in which a subject outside the focus detection region has an influence on the focus detection result when the readout area is larger than the focus detection region.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-094638, filed on Apr. 26, 2013, which is hereby incorporated by reference herein its entirety.

What is claimed is:

1. An image capture apparatus comprising:
a sensor that has a plurality of pixel units in correspondence with a microlens; and
a microprocessor that executes a program, wherein the program causes the microprocessor to operate as:
a focus detection unit configured to perform focus detection with a phase-difference detection method using output from the sensor,
wherein signals to be used in the focus detection are combined,
the focus detection unit sets a larger signal combining amount in a case of output from the sensor with a first thinning number than in a case of output from the sensor with a second thinning number, and
a thinning amount is higher in a case of using the second thinning number than in a case of using the first thinning number.

2. The image capture apparatus according to claim 1, wherein signal combining performed by the focus detection unit reduces a difference between sizes of regions for performing the focus detection.

3. The image capture apparatus according to claim 1, wherein a plurality of signals respectively corresponding to light flux that exited different exit pupils can be read out from a pixel unit of the sensor.

4. The image capture apparatus according to claim 1, wherein the program further causes the microprocessor to operate as a processing unit configured to perform image processing for performing recording using output from the sensor.

5. The image capture apparatus according to claim 1,
wherein the sensor can output signals in units of pixel lines, and
the focus detection unit combines a plurality of image signals generated from respective pixel lines.

6. The image capture apparatus according to claim 1, wherein the combining is addition.

7. The image capture apparatus according to claim 1, wherein the focus detection unit changes a signal combining amount according to a ratio between the first thinning number and the second thinning number.

8. The image capture apparatus according to claim 7, wherein the focus detection unit sets the signal combining amount so as to reduce a difference between sizes of regions for performing the focus detection in a case of using the first thinning number and a case of using the second thinning number.

9. The image capture apparatus according to claim 1, wherein the first thinning number and the second thinning number have values that correspond to a shooting mode of the image capture apparatus.

10. The image capture apparatus according to claim 1, wherein the first thinning number and the second thinning number have values that correspond to a shooting frame rate of the image capture apparatus.

11. The image capture apparatus according to claim 1, wherein a region for performing the focus detection in a case of using a reference thinning number is a region that corresponds to a pre-set focus detection region.

12. The image capture apparatus according to claim 1, further comprising:
a lens controller configured to control a lens based on a focus detection result obtained by the focus detection unit,
wherein the focus detection unit generates a plurality of image signals to be used in the focus detection with the phase-difference detection method, and
wherein, among output from the sensor, the focus detection unit uses signals from pixel units included in a set readout area when generating the plurality of image signals.

13. A method of controlling an image capture apparatus that has a sensor having a plurality of pixel units for a microlens, comprising:
a focus detection step of performing focus detection with a phase-difference detection method using output from the sensor,
wherein signals to be used in the focus detection step are combined,
in the focus detection step, a larger signal combining amount is set in a case of output from the sensor with a first thinning number than in a case of output from the sensor with a second thinning number, and
a thinning amount is higher in a case of using the second thinning number than in a case of using the first thinning number.

* * * * *